US008801561B1

(12) United States Patent
Kii

(10) Patent No.: US 8,801,561 B1
(45) Date of Patent: Aug. 12, 2014

(54) POWER SWITCHING DEVICE FOR VEHICLE

(71) Applicant: Kawasaki Jukogyo Kabushiki Kaisha, Hyogo (JP)

(72) Inventor: Hideaki Kii, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 9 days.

(21) Appl. No.: 13/778,657

(22) Filed: Feb. 27, 2013

(51) Int. Cl.
*F16H 48/20* (2012.01)
*F16H 61/68* (2006.01)

(52) U.S. Cl.
CPC ..................................... *F16H 61/68* (2013.01)
USPC ....... 475/231; 74/335; 74/473.12; 74/473.37; 475/198; 180/249

(58) Field of Classification Search
CPC .... B60K 17/346; B60K 23/08; F16H 63/304; F16H 2063/3056; F16H 2048/343
See application file for complete search history.

(56) References Cited

U.S. PATENT DOCUMENTS

| 4,462,271 | A | * | 7/1984 | Stieg | 475/86 |
| 5,411,110 | A | * | 5/1995 | Wilson et al. | 180/247 |
| 5,853,342 | A | * | 12/1998 | Pritchard et al. | 475/206 |
| 7,101,304 | B2 | * | 9/2006 | Swanson et al. | 475/295 |
| 7,951,038 | B2 | * | 5/2011 | Ina et al. | 475/231 |
| 2006/0032692 | A1 | * | 2/2006 | Ima et al. | 180/249 |
| 2013/0167681 | A1 | * | 7/2013 | Kii et al. | 74/473.12 |

FOREIGN PATENT DOCUMENTS

| JP | 2000-118257 | 4/2000 |
| JP | 2011-121458 | 6/2011 |

\* cited by examiner

*Primary Examiner* — David D Le
(74) *Attorney, Agent, or Firm* — Wenderoth, Lind & Ponack, L.L.P.

(57) ABSTRACT

A power switching device for vehicle has at least first and second power switching mechanisms, a shared operating mechanism, and a housing accommodating the power switching mechanisms and the shard operating mechanism, the housing being integrally formed with a boss portion having a waiting mechanism, wherein the waiting mechanism includes drive and driven cylindrical shafts, and a coil spring connecting between the cylindrical shafts, both of the cylindrical shafts and the coil spring are arranged in a same axis, and are supported on an inner peripheral surface of the boss portion through drive and driven side needle roller bearings respectively, the coil spring is arranged inside the cylindrical shafts.

6 Claims, 12 Drawing Sheets

Fig.2 Second Position

Second Position

First Position

Waiting (First Position)

Second Position

Waiting (Second Position)

Third Position

POWER SWITCHING DEVICE FOR VEHICLE

BACKGROUND OF INVENTION

1. Technical Field of the Invention

The present invention relates to a power switching device for a vehicle arranged on a motive power transmission passage from a driving source to wheels.

2. Description of the Prior Art

A power switching mechanism constituting the power switching device for vehicle includes, for example, a two-wheel-drive/four-wheel-drive switching mechanism, a differential lock mechanism, a speed change gear mechanism, or different kinds of clutch mechanisms. Some of the power switching mechanisms have a waiting mechanism which can temporarily accumulate operative power by means of a coli spring.

One type of the power switching mechanism with the coil spring is to utilize compression and tension of the coil spring in an axis direction thereof, and the other type is to utilize torsion or twist of the coil spring around the axis thereof. Japanese Patent publication No. 2011-121458 discloses a differential lock mechanism having the former waiting mechanism, and Japanese Patent publication No. 2000-118257 shows a differential lock mechanism having the latter waiting mechanism.

FIG. 14 shows the latter waiting mechanism, a shared support shaft 201 is supported by a pair of bearing bosses 203 at both ends of the support shaft 201. A drive cylindrical shaft 205 located on an operation side and a driven cylindrical shaft 206 located on an actuation side are rotatably fit on an outer peripheral surface of the support shaft 201 so as to rotate independently each other. A coil spring 210 is disposed on outer peripheral surfaces of the drive and driven cylindrical shafts 205, 206. One end of the coil spring 210 is engaged with an operating arm 205a fixed on the drive cylindrical shaft 205, and another end of the coil spring 210 is engaged with an actuating arm 206a fixed on the driven cylindrical shaft 206.

The operating arm 205a is connected to an electric actuator 211 so as to transmit operative power for switching. The actuating arm 206a has a shift pin 212 which is connected to a differential lock mechanism 213.

When the operating arm 205a is rotated by the electric actuator 211, the actuating arm 206a is rotated through the coil spring 210, so that the differential lock mechanism 213 is switched between locked condition and unlocked condition by means of the shift pin 212. In case that the differential lock mechanism is switched from lock condition to unlock condition, a drive dog teeth and a driven dog teeth (or recess) are changed from disengaged state to engaged state. However, when end faces of both the dog teeth are abutted each other, the coil spring 210 is distorted or twisted around the axis of the coil spring. As a result, the power switching mechanism will come into waiting condition.

In the structure shown in FIG. 14 of the prior art, the drive cylindrical shaft 205 and the driven cylindrical shaft 206 are rotatably supported on the outer peripheral surface of the shared support shaft 201, the coil spring 210 is disposed on the outer peripheral surfaces of the drive and driven cylindrical shafts 205, 206. According to the structure of the prior art, a supporting area of the shared shaft 201 to support the cylindrical shafts 205, 206 is small in area, therefore contact pressure acting on the outer peripheral surface of the shared support shaft 201 becomes large. As a result, operating load becomes large. In case that the operating load becomes large, it is required to provide a big volume coil spring having large spring strength or constant, in order to produce the waiting action.

Further, in case that only the differential lock mechanism is operated, two switching positions shall be sufficient for switching of the power switching device. However, in case that three or more switching positions are required by adding the other switching device, it will be required to increase torsion angle of the coil spring. But, in case that relative torsion angle between the drive cylindrical shaft 205 and the driven cylindrical shaft 206 is increased, the coil spring is contracted or reduced in a radial direction by the torsion of the coil spring. By the contraction of the coil spring in the radial direction, the coil spring is pressed against the outer peripheral surface of the shared support shaft 201. Therefore, it will become difficult to produce smoothly the waiting action.

SUMMARY OF THE INVENTION

The present invention is achieved in consideration with the above problem, and an object thereof is, in a power switching device, to increase an area of a surface rotatably supporting a drive cylindrical shaft and a driven cylindrical shaft, thereby suppress contact pressure of the surface, as a result it becomes possible to produce smooth switching operation and smooth waiting action and to increase the torsion angle between the cylindrical shafts.

In order to achieve above the object, a power switching device for vehicle according the present invention comprises at least first and second power switching mechanisms arranged on the way of a driving force transmission passage from a driving source to wheels; a shared operating mechanism to switch both of the first and second power switching mechanisms on and off; the shared operating mechanism having a waiting mechanism; and a housing accommodating the first and second power switching mechanisms and the shard operating mechanism, the housing being integrally formed with a boss portion having the waiting mechanism built-in, wherein the waiting mechanism includes a drive cylindrical shaft located in operation side, a driven cylindrical shaft located in actuation side, and a coil spring connecting the driven cylindrical shaft with the drive cylindrical shaft so as to transmit operating power, both of the drive and driven cylindrical shafts and the coil spring are arranged in a same cylindrical shaft axis, the drive cylindrical shaft is supported on an inner peripheral surface of the boss portion through a drive side needle roller bearing, and the driven cylindrical shaft is supported on the inner peripheral surface of the boss portion through a driven side needle roller bearing, and the coil spring is arranged inside the drive cylindrical shaft and the driven cylindrical shaft.

According to the present invention, outer peripheral surfaces of the drive cylindrical shaft and the driven cylindrical shaft are supported on the inner peripheral surface of the boss portion through the needle roller bearings respectively, so that a surface supporting both the cylindrical shafts increases, thereby suppress contact pressure of the surface, as a result it becomes possible to smoothly-rotate the both cylindrical shafts and smoothly-produce waiting action due to the torsion of the coil spring.

In addition, it becomes possible to increase a diameter of the coil spring without enlarging an inside diameter of the boss portion, thereby increase maximum a torsion angle of the coil spring. As a result, even if a large rotation angle of the driven cylindrical shaft is required (number of the switching positions is increased), the waiting action will be smoothly produced on any position.

The above invention may have the following features.

(a) The drive cylindrical shaft and the driven cylindrical shaft have substantially the same outside diameter, the inner peripheral surface of the boss portion has an uniform inside diameter, and the drive side needle roller bearing and the driven side needle roller bearing are arranged next to each other in the cylindrical shaft axis, and are retained by a shared retainer.

With the above configuration (a), a structure of the waiting mechanism becomes simple, and a work to incorporate the waiting mechanism into the boss portion is improved.

(b) In the power switching device for vehicle including the above configuration (a), one of the drive cylindrical shaft and the driven cylindrical shaft is formed with an arcuate notch about the cylindrical shaft axis, and the other is formed with a projection for engaging with the notch so as to be movable in a circumferential direction, and only when at least one of the first and second switching mechanisms is operated from a disengaged condition of the power to an engaged condition, the projection and the notch are relatively moved in the circumferential direction to compress the coil spring.

With the above configuration (b), in the case that the first switching mechanism or the second switching mechanism is switched, it becomes possible to produce the waiting action only when the switching mechanism is operated to an engagement condition in which the waiting action is required. On the contrary, when the switching mechanism is operated to a disengagement condition, the waiting action is not produced. Thereby, in any case of the engagement action and the disengagement action, the power switching device smoothly acts corresponding to the switching operation.

(c) In the power switching device for vehicle including the above configuration (b), the restricting notch and the restricting projection are located in a position corresponding to a boundary between the drive side needle roller bearing and the driven side needle roller bearing in the cylindrical shaft axis direction, and are opposite to the above boundary from inside in a radial direction of the cylindrical shafts.

With the above configuration (c), it becomes possible to make efficient use of a space between the drive side needle roller bearing and the driven side needle roller bearing, and the waiting mechanism can be made compact.

(d) In the power switching device for vehicle, the first switching mechanism is a two-wheel-drive/four-wheel-drive switching mechanism, and the second switching mechanism is a differential lock mechanism which can lock a differential device.

With the above configuration (d), in the vehicle provided with the two-wheel-drive/four-wheel-drive switching mechanism and the differential lock mechanism, any switching operation, of the two-wheel-drive/four-wheel-drive switching mechanism and the differential lock mechanism, can be performed utilizing the waiting mechanism.

(e) In the power switching device for vehicle including the above configuration (d), the shared shift lever of the shared operating mechanism can be switched among a first position, a second position and a third position, when the shared shift lever is located in the first position, the two-wheel-drive/four-wheel-drive switching mechanism is in a two-wheel-drive condition, and the differential lock mechanism is in an unlocked condition, when the shared operation shift lever is located in the second position, the two-wheel-drive/four-wheel-drive switching mechanism is in a four-wheel-drive condition, and the differential lock mechanism is in the unlocked condition, and when the shared shift lever is located in the third position, the two-wheel-drive/four-wheel-drive switching mechanism is in the four-wheel-drive condition, and the differential lock mechanism is in a locked condition,

BRIEF DESCRIPTION OF THE DRAWINGS

The above object, features, and advantages of the present invention will be more apparent from the following description in connection with the accompanying drawings.

DETAILED DESCRIPTION OF THE PREFERRED EMBODIMENTS

Embodiment

FIGS. 1 to 13 show an embodiment of a power switching device for vehicle according to the present invention, and the embodiment of the present invention will be described with reference to these drawings.

Figure 1:
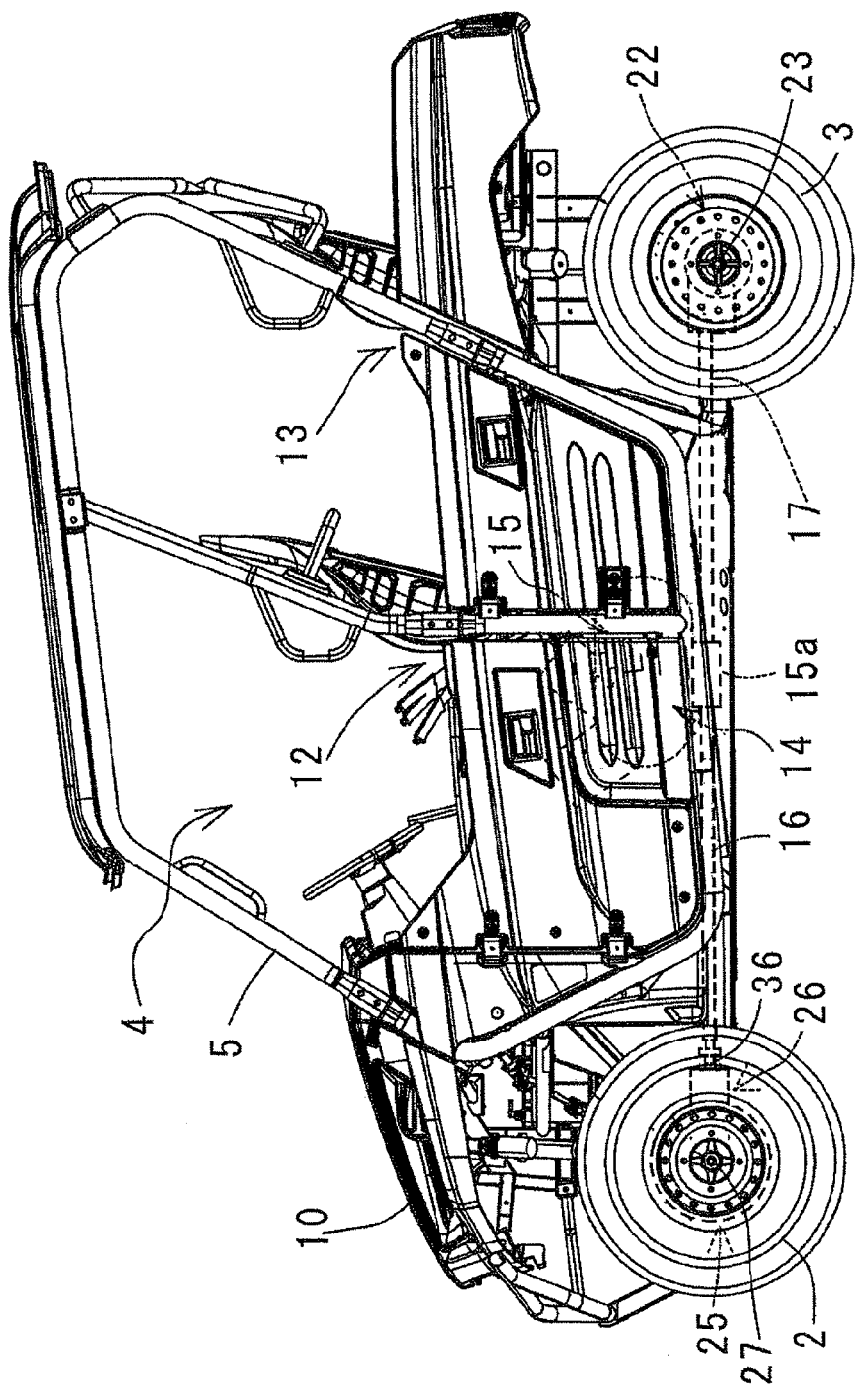
FIG. 1 is a left side view of a utility vehicle having a power switching device for vehicle according to the present invention.

FIG. 1 is a left side view of a utility vehicle having the power switching device for vehicle according to the present invention, the utility vehicle has a pair of right and left front wheels 2 in a front portion of a vehicle body, a pair of right and left rear wheels 3 in a rear portion of the vehicle body, and a riding space 4 between the front wheels 2 and the rear wheels 3, the riding space 4 being surrounded by a ROPS 5. Further, a hood 10 is provided in front of the riding space 4. A front seat 12 is provided in a front half portion of the riding space 4, a rear seat 13 is provided in a rear half portion of the riding space 4, and an engine 14 is provided as a driving source for driving the vehicle on a lower side of the front seat 12 (a lower side between a driver's seat and a front passenger's seat).

The engine 14 has a transmission 15. A propeller shaft 16 for front wheels extending forward and a propeller shaft 17 for rear wheels extending rearward are connected to a power take-off portion 15a at a lower end of the transmission 15. A rear end of the propeller shaft for rear wheels 17 is coupled to right and left rear axles 23 via a final reduction gear for rear wheels 22. A front end of the propeller shaft for front wheels 16 is coupled to right and left front axles 27 via a universal joint 36 and a final reduction gear for front wheels 26 having a differential device for front wheels 25.

Figure 2:
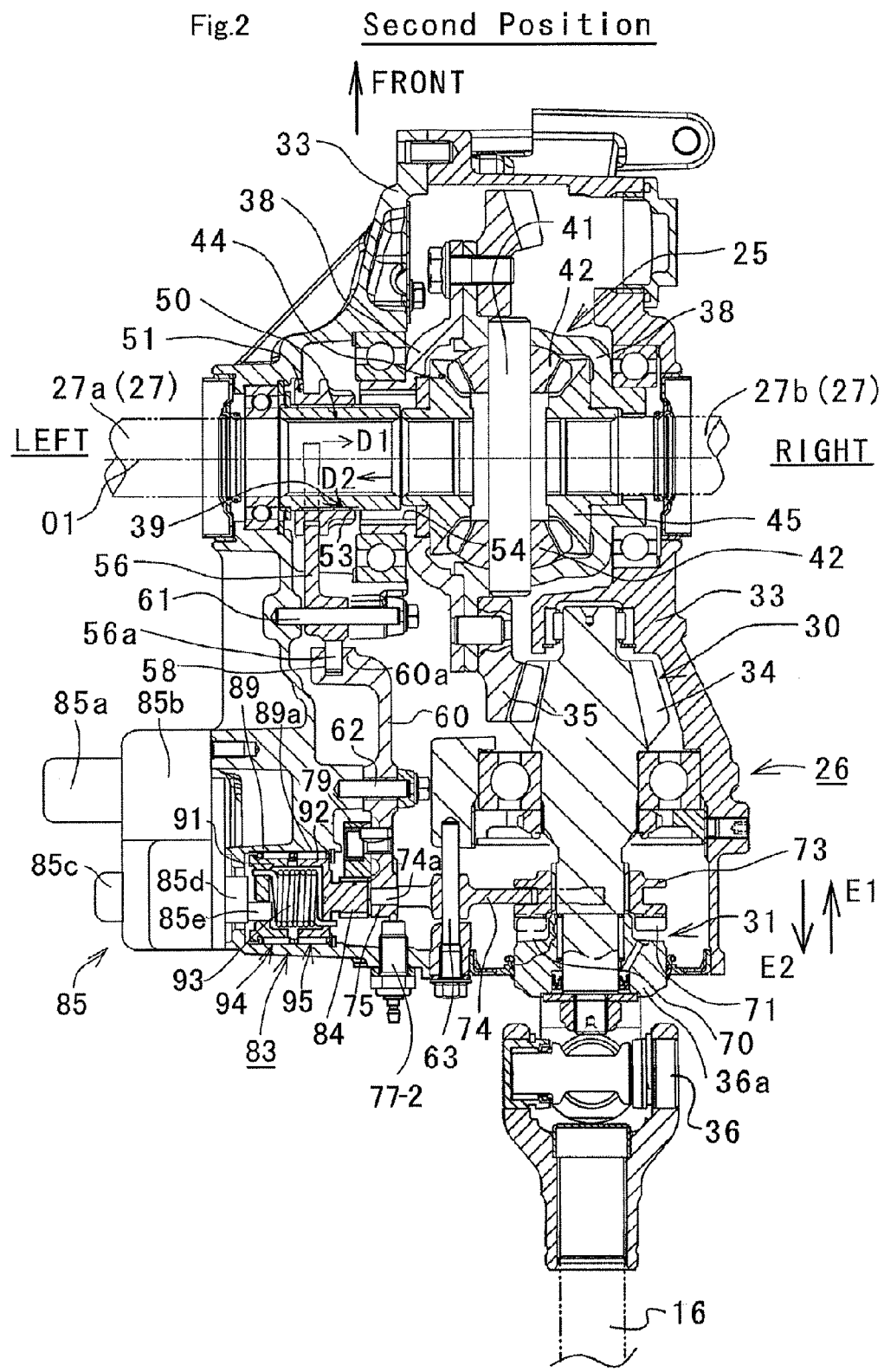
FIG. 2 is a horizontal sectional view of a final reduction gear for front wheels of FIG. 1.

FIG. 2 is a horizontal sectional view of the final reduction gear for front wheels 26, in a reduction gear case 33 of the final reduction gear 26 for front wheels, the differential device 25 for front wheels, a final reduction gear mechanism 30 for front wheels, the two-wheel-drive/four-wheel-drive switching mechanism 31, and the differential lock mechanism 39 for front wheels are arranged. The above two-wheel-drive/four-wheel-drive switching mechanism 31 corresponds to a first switching mechanism of the present invention, and the above the differential lock mechanism 39 corresponds to a second switching mechanism of the present invention. It should be noted that the reduction gear case 33 has a case body and a case cover, which are indicated by the same reference numeral "33".

The final reduction gear mechanism 30 has an input pinion 34 extending in a front-rear direction and a large-diameter ring gear 35. A rear end of a shaft portion of the input pinion 34 is connected to the universal joint 36 via the two-wheel-drive/four-wheel-drive switching mechanism 31. A rear end of the universal joint 36 is spline-fitted to a front end of the propeller shaft 16 for front wheels. The ring gear 35 is coupled to a differential case 38 of the differential device 25 and is rotated about a front axle axis O1 so as to be integral with the differential case 38.

The differential device 25 has the differential case 38, a support shaft 41 fixed to the differential case 38, a pair of differential gears 42 rotatably supported by the support shaft 41, and a left side gear 44 and a right side gear 45 for engaging with both the differential gears 42. A right front axle 27b is spline-fitted to the right side gear 45, and a left front axle 27a is spline-fitted to the left side gear 44. In the embodiment, the differential lock mechanism 39 is provided between the left front axle 27a and the differential case 38. In other words, the differential lock mechanism 39 directly couples the differential case 38 and the left front axle 27a to bring the differential device 25 into a locked condition.

[Differential Lock Mechanism 39]

The differential lock mechanism 39 has inner spline teeth 54 formed on an inner circumferential surface of a boss portion at a left end of the differential case 38, and outer spline teeth 53 formed on an outer circumferential surface of a first shift sleeve 51 movable in a front axle direction. The first shift sleeve 51 is spline-fitted to an outer circumferential surface of a coupling sleeve 50 fixed to a right end of the left front axle 27a so as to be movable in the front axle direction.

A condition of the differential lock mechanism 39 of FIG. 2 is a condition in which the first shift sleeve 51 is located in an unlock position, and the outer spline teeth 53 disengage from the inner spline teeth 54. The first shift sleeve 51 in the unlock position of FIG. 2 is moved in a direction indicated by an arrow D1 (rightward), so that the outer spline teeth 53 engage with the inner spline teeth 54 to lock the differential device 25 for front wheels.

As the operating mechanism for moving the first shift sleeve 51 in the front axle direction, a first shift fork 56 for engaging with an outer circumference annular groove of the first shift sleeve 51 and a shift lever 60 having a first guide groove 58 for engaging with a first drive pin 56a of the first shift fork 56 are provided. The first shift fork 56 is supported by a first shift support shaft 61 arranged in parallel with the front axle 27 so as to be movable in a shift axial direction. The shift lever 60 is rotatably supported by a lever support shaft 62 fixed to the reduction gear case 33. The shift lever 60 is also used as the operating mechanism of the two-wheel-drive/four-wheel-drive switching mechanism 31.

Figure 3:
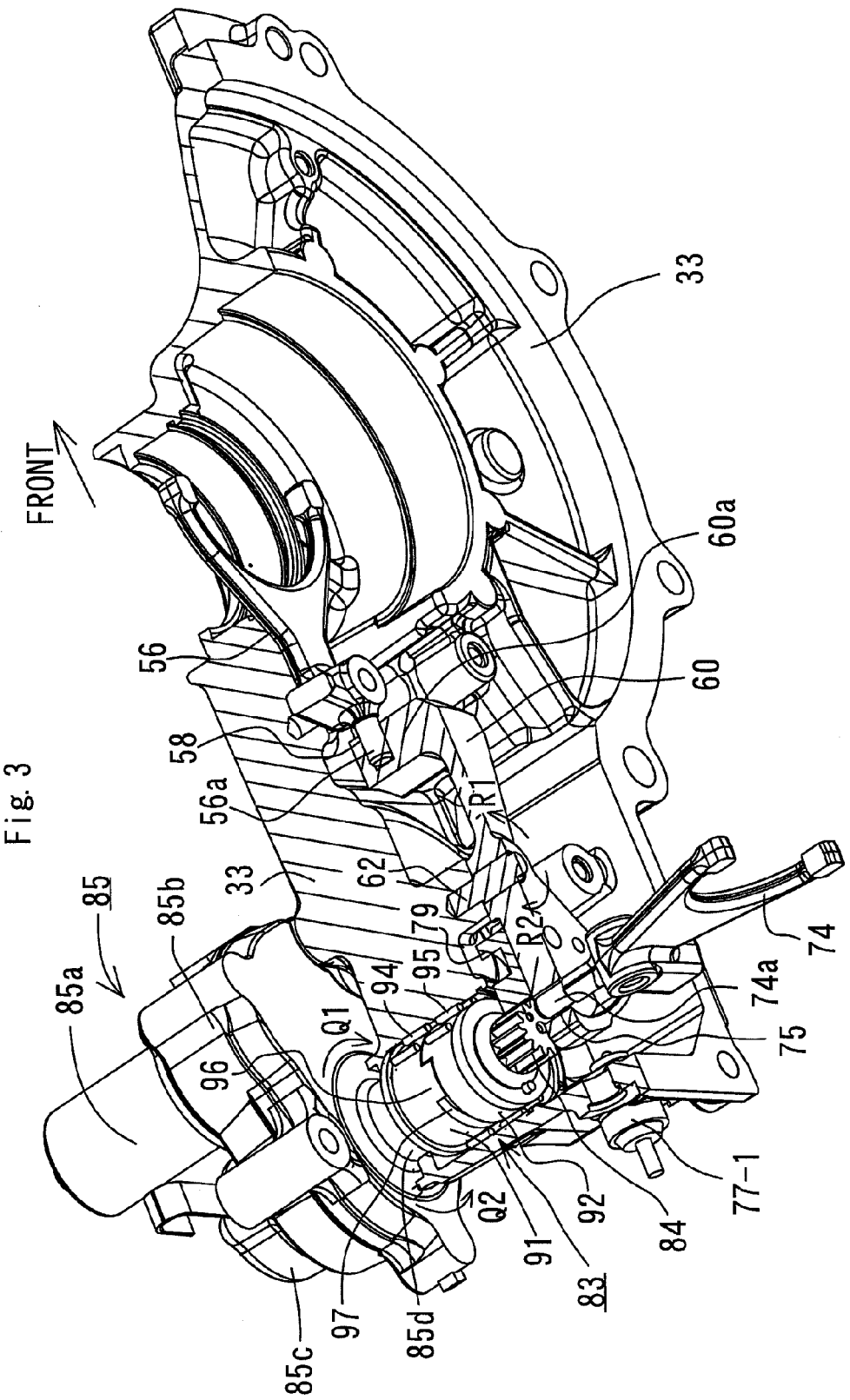
FIG. 3 is an enlarged section perspective view of an operating mechanism of FIG. 2.

FIG. 3 is an enlarged section perspective view of an operating mechanism in the final reduction gear for front wheels 26, a partially cylindrical end 60a projecting leftward is formed at a front end of the shift lever 60, and the first guide groove 58 with which the first drive pin 56a of the first shift fork 56 engages is formed on a front end face of the partially cylindrical end 60a.

[Two-Wheel-Drive/Four-Wheel-Drive Switching Mechanism 31]

In FIG. 2 the two-wheel-drive/four-wheel-drive switching mechanism 31 has drive dog teeth 70 and driven dog teeth 71 opposite to each other in the front-rear direction. The driven dog teeth 71 are formed on a rear end face of a second shift sleeve 73 and project rearward, and the second shift sleeve 73 is spline-fitted to an outer circumferential surface at the rear end of the shaft portion of the input pinion 34 so as to be movable in the front-rear direction. The drive dog teeth 70 are formed on a front end face of a boss member 36a coupled to a front end of the universal joint 36 and project forward.

As the operating mechanism for moving the second shift sleeve 73 in the front-rear direction, a second shift fork 74 for engaging with an outer circumference annular groove of the second shift sleeve 73 is provided. The second shift fork 74 is supported by a second shift support shaft 63 fixed to the reduction gear case 33 and extending in the front-rear direction so as to be movable in the front-rear direction, and a second drive pin 74a of the second shift fork 74 engages with a second guide groove 75 formed at a rear end of the shared shift lever 60.

The second shift sleeve 73 of FIG. 2 is located in a four-wheel-drive position, and when the second shift sleeve 73 is moved from the four-wheel-drive position in a direction indicated by an arrow E1 (forward) to reach a two-wheel-drive position, engagement of both the dog teeth 70 and 71 is released, so that the two-wheel-drive/four-wheel-drive switching mechanism 31 is brought into a two-wheel-drive condition (rear-wheel-drive condition).

[The Configurations of the Shared Operating Mechanism and an Electric Actuator 85]

Figure 6:
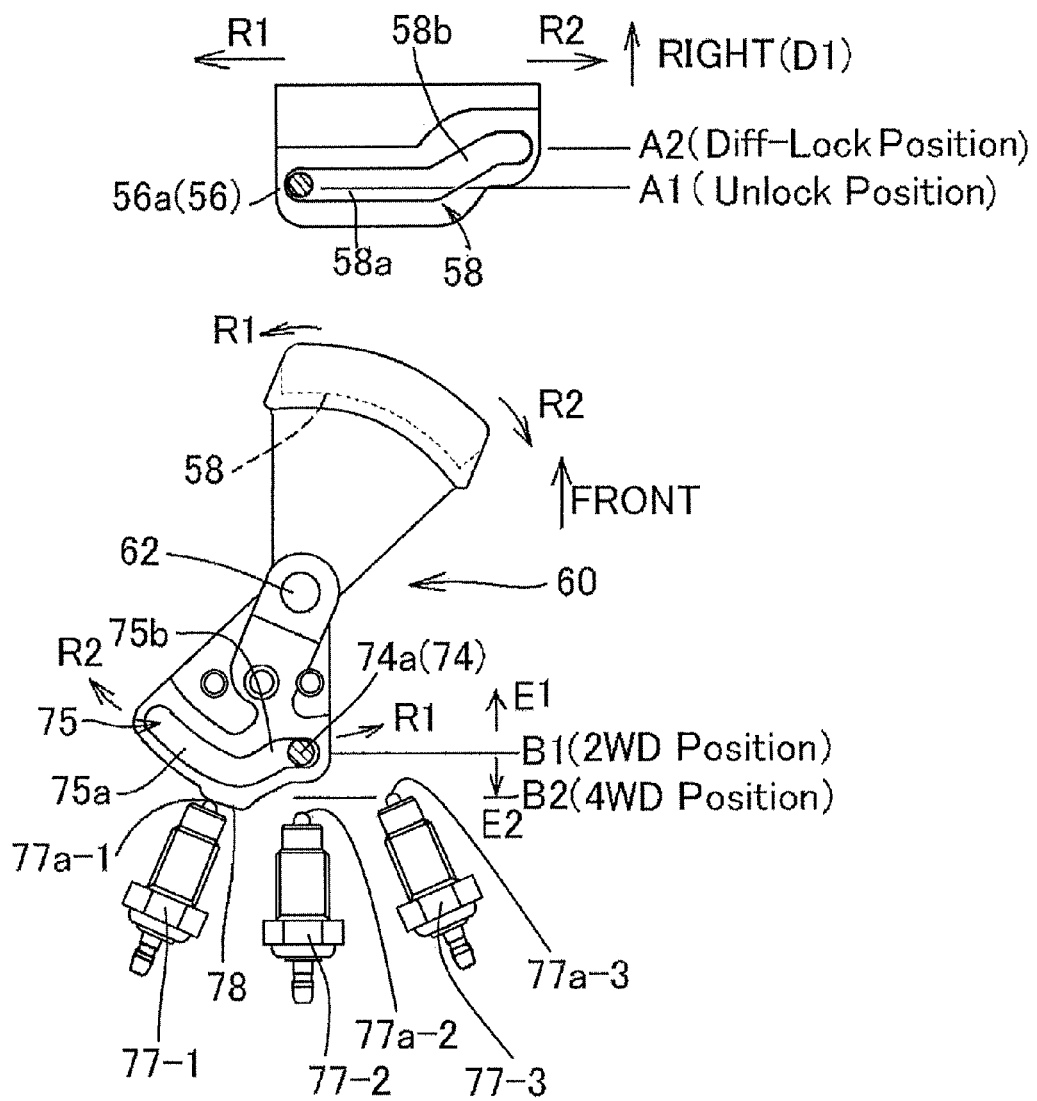
FIG. 6 is a side view of a shift lever when a two-wheel-drive/four-wheel-drive switching mechanism is in a two-wheel-drive condition and a differential lock mechanism is in an unlocked condition (a first position)
Figure 7:
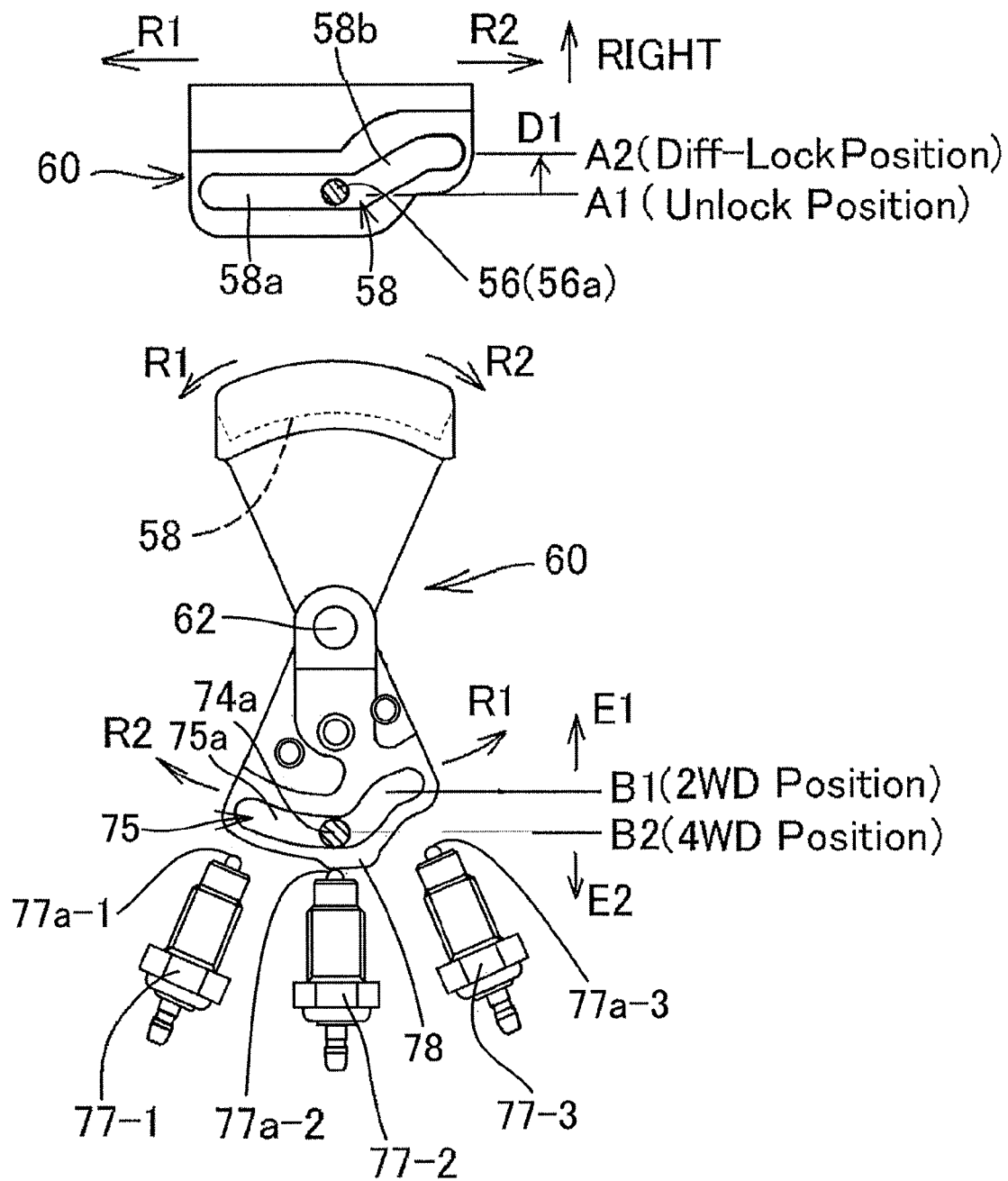
FIG. 7 is a side view of the shift lever when the two-wheel-drive/four-wheel-drive switching mechanism is in a four-wheel-drive condition and the differential lock mechanism is in the unlocked condition (a second position)
Figure 8:
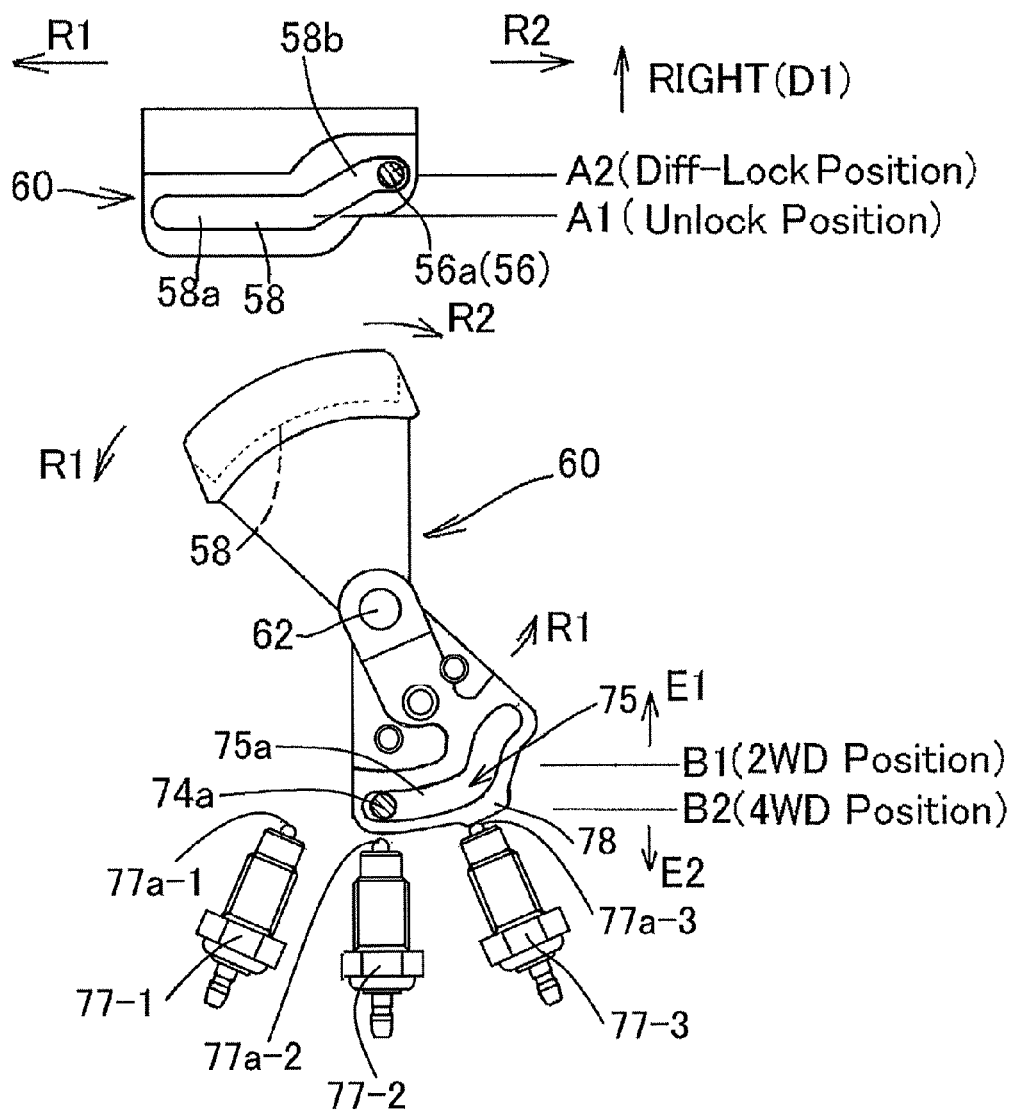
FIG. 8 is a side view of the shift lever when the two-wheel-drive/four-wheel-drive switching mechanism is in the four-wheel-drive condition and the differential lock mechanism is in a locked condition (a third position)

The shared shift lever 60 is rotated about the lever support shaft 62 and can be switched between a first position shown in FIG. 6 (the two-wheel-drive and unlock position), a second position shown in FIG. 7 (the four-wheel-drive and unlock position), and a third position shown in FIG. 8 (the four-wheel-drive and lock position). It should be noted that FIGS. 6 to 8 correspond to side views of the shift lever 60 seen from left and front views of a front end face of the shift lever 60 are also shown above the respective side views.

In FIG. 6, the first guide groove 58 of the shift lever 60 with which the first drive pin 56a engages has a first groove portion 58a extending along a circumferential direction of the shift lever 60, and a second groove portion 58b inclining from an end of the first groove portion 58a in the direction indicated by the arrow D1 (rightward). In the first and second positions of the shift lever 60 of FIGS. 6 and 7, the first drive pin 56a is located in an unlock position A1, and in the third position of FIG. 8, the first drive pin 56a is located in a lock position A2.

In FIG. 6, the second guide groove 75 of the shift lever 60 with which the second drive pin 74a engages has a first groove portion 75a extending along the circumferential direction of the shift lever 60, and a second groove portion 75b inclining from an end of the first groove portion 75a to the lever support shaft 62 side. In the first position of FIG. 6, the second drive pin 74a is located in a two-wheel-drive position B1, and in the second and third positions of FIGS. 7 and 8, the second drive pin 74a is located in a four-wheel-drive position B2.

In other words, when the shift lever 60 is in the first position of FIG. 6, the two-wheel-drive/four-wheel-drive switching mechanism 31 of FIG. 2 is brought into the two-wheel-drive condition and the differential lock mechanism 39 is brought into the unlocked condition. When the shift lever 60 is in the second position of FIG. 7, the two-wheel-drive/four-wheel-drive switching mechanism 31 of FIG. 2 is brought into the four-wheel-drive condition and the differential lock mechanism 39 is brought into the unlocked condition. When the shift lever 60 is in the third position of FIG. 8, the two-wheel-drive/four-wheel-drive switching mechanism 31 of FIG. 2 is brought into the four-wheel-drive condition and the differential lock mechanism 39 is brought into the locked condition.

In addition, three contact type position sensors 77-1, 77-2, and 77-3 are spaced in the circumferential direction so as to be opposite to a rear end face of the shift lever 60. On the other hand, a projection 78 for position detection abuttable onto ends of detection pins 77a-1, 77a-2, and 77a-3 of the three position sensors 77-1, 77-2, and 77-3 is formed on the rear end face of the shift lever 60. In other words, when the shift lever 60 is in the first position of FIG. 6, the projection 78 is brought into contact with the detection pin 77a-1 of the first position sensor 77-1, and with this, a meter of the driver's seat displays with a lamp that the shift lever 60 is in the first position (the two-wheel-drive and unlocked condition). When the shift lever 60 is in the second position of FIG. 7, the projection 78 is brought into contact with the detection pin 77a-2 of the second position sensor 77-2, and with this, the meter of the driver's seat displays with a lamp that the shift lever 60 is in the second position (the four-wheel-drive and unlocked condition). When the shift lever 60 is in the third position of FIG. 8, the projection 78 is brought into contact with the detection pin 77a-3 of the third position sensor 77-3, and with this, the meter of the driver's seat displays with a lamp that the shift lever 60 is in the third position (the four-wheel-drive and locked condition).

In FIG. 2, a sector gear 79 is fixed to a left side surface of the shared shift lever 60 having the first and second guide grooves 58 and 75, and engages with an output gear 84 of a waiting mechanism 83. An input portion of the waiting mechanism 83 is coupled to an output shaft 85d of the electric actuator 85 through an eccentric drive pin 85e. In other words, the shared shift lever 60 is rotated about the lever support shaft 62 by operating power (rotating force) generated in the electric actuator 85 via the waiting mechanism 83 to operate the differential lock mechanism 39 and the two-wheel-drive/four-wheel-drive switching mechanism 31.

The electric actuator 85 is attached to a left side surface of the reduction gear case 33, and is provided therein with an electric motor 85a, a reduction gear mechanism 85b having a plurality of reduction gears, and a potentiometer 85c attached to an end of any rotational shaft of the reduction gear mechanism 85b (e.g., the output shaft 85d on the most downstream side of driving force).

[The Configuration of the Waiting Mechanism 83]

Figure 4:
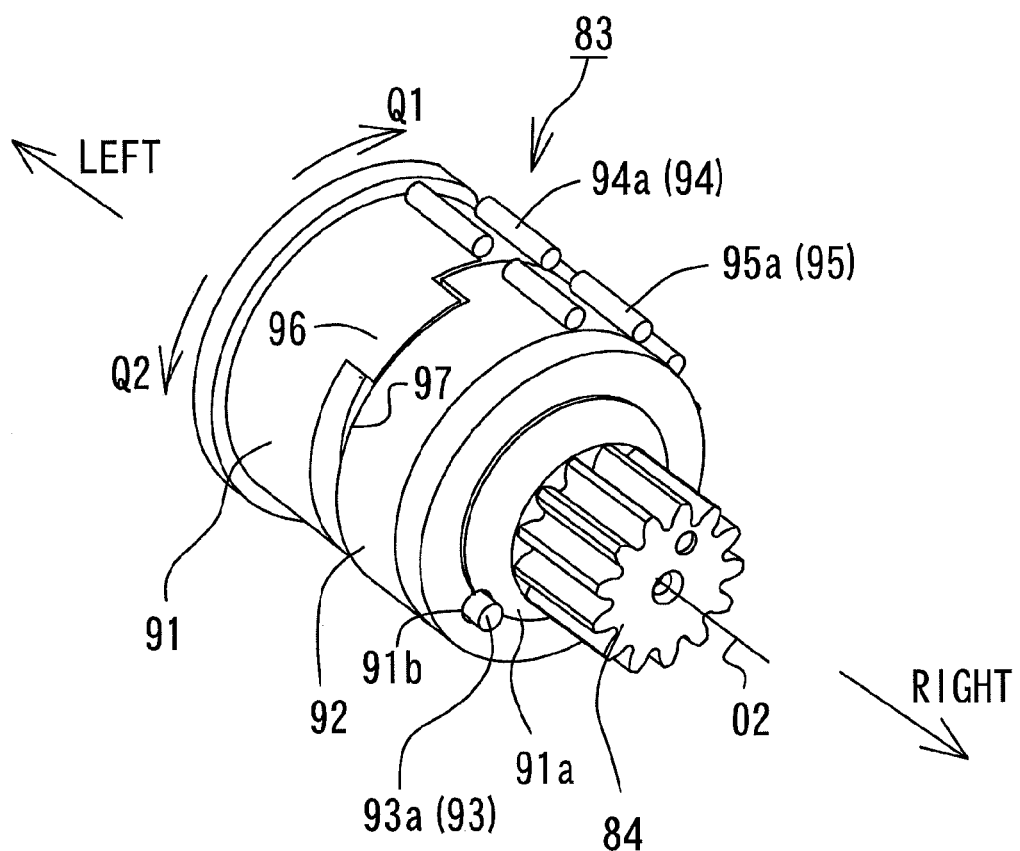
FIG. 4 is an exploded perspective view of a waiting mechanism.
Figure 5:
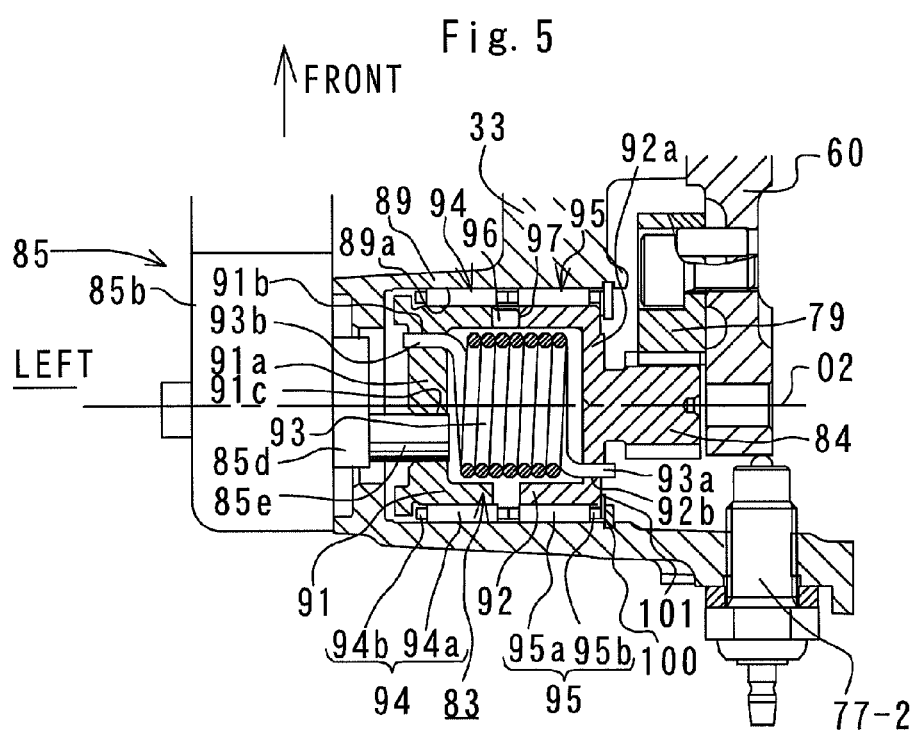
FIG. 5 is an enlarged horizontal sectional view of the waiting mechanism.

FIG. 4 and FIG. 5 are an exploded perspective view and an enlarged horizontal sectional view of the waiting mechanism 83. In FIG. 4, the waiting mechanism 83 has, on a same cylindrical shaft axis O2, a drive cylindrical shaft 91 in an operation side, a driven cylindrical shaft 92 formed integrally with the output gear 84 in an actuation side, a coil spring 93 accommodated in both of the drive cylindrical shaft 91 and the driven cylindrical shaft 92, and a drive side needle roller bearings 94 disposed on an outer peripheral surface of the drive cylindrical shaft 91 (show only a portion of needle rollers 94a in the figure), and a driven side needle roller bearings 95 disposed on an outer peripheral surface of the driven cylindrical shaft 92 (show only a portion of needle rollers 95a in the figure). The drive cylindrical shaft 91 and the driven cylindrical shaft 92 have substantially a same outside diameter, and are disposed so as to be opposite to each other in the cylindrical shaft axis O2 direction. In addition, regarding the coil spring 93 of FIG. 4, only one end 93a thereof can be seen.

In FIG. 5, a reduction gear case 33 is integrally formed with a cylindrical shaped boss portion 89 accommodating the waiting mechanism 83. An inner peripheral surface 89a of the boss portion 89 has a substantial uniform inside diameter. An output side portion of the electric actuator 85 is mounted on a left side surface of the boss portion 89. The drive side needle roller bearing 94 and the driven side needle roller bearing 95 have a same shape and a same dimension each other. The drive side needle roller bearing 94 comprises the plurality of needle rollers 94a and a retainer 94b, and the driven side needle roller bearing 95 comprises the plurality of needle rollers 95a and a retainer 95b. The drive side needle roller bearing 94 is disposed in a left half region of the boss portion 89, and rotatably supports the outer peripheral surface of the drive cylindrical shaft 91 on the inner peripheral surface 89a of the boss portion 89. The driven side needle roller bearing 95 is disposed in a right half region of the boss portion 89, and rotatably supports an outer peripheral surface of the driven cylindrical shaft 92 on the inner peripheral surface 89a of the boss portion 89. A right end of the retainer 95b of the driven side needle roller bearing 95 is stopped by a snap ring 100 fitted in a circumference groove and an auxiliary stopper ring 101 in the cylindrical shaft axis O2 direction.

The drive cylindrical shaft 91 is integrally formed with a left end wall 91a, and the driven cylindrical shaft 92 is integrally formed with a right end wall 92a. An inside diameter of the drive cylindrical shaft 91 and an inside diameter of the driven cylindrical shaft 92 are substantially same. The left end wall 91a of the drive cylindrical shaft 91 has a pin engaged hall 91c at an eccentric position distant from the cylindrical shaft axis O2. The aforementioned eccentric drive pin 85e, formed on the output shaft 85d of the electric actuator 95, is engaged with the pin engaged hall 91c.

The coil spring 93 is arranged between the left end wall 91a and right end wall 92a. One end (right end) 93a of the coil spring 93 is engaged with an engaging hall 92b formed the right end wall 92a of the driven cylindrical shaft 92, and the other end (left end) 93b of the coil spring 93 is engaged with an engaging hall 91b formed the left end wall 91a of the drive cylindrical shaft 91.

A center line of the coil spring 93 is coincided with the cylindrical shaft axis O2, and the coil spring 93 has a waiting function. Namely, the operating power from the electric actuator 85 can be temporarily accumulated by twisting the coil spring 93 around the cylindrical shaft axis O2.

However, the waiting function of the waiting mechanism 83 is restricted by a waiting action restricting mechanism. The waiting action restricting mechanism is constituted by a restricting projection 96 and a restricting notch 97 so that the waiting function is effectively produced only when the drive cylindrical shaft 91 rotates in one rotating direction, and is not produced when the drive cylindrical shaft 91 rotates in another rotating direction. In the embodiments, the operating power can be temporarily accumulated only when the shift lever 60 is moved from the first position of FIG. 6 to the second position of FIG. 7 in a direction indicated by an arrow R1 and only when the shift lever 60 is moved from the second position of FIG. 7 to the third position of FIG. 8 in the direction indicated by the arrow R1. In other words, the operating power cannot be accumulated by the restricting mechanism when the shift lever 60 is rotated from the third position of FIG. 8 to the second position of FIG. 7 in a direction indicated by an arrow R2 and when the shift lever 60 is rotated from the second position of FIG. 7 to the first position of FIG. 6 in the direction indicated by the arrow R2.

The waiting action restricting mechanism will be specifically described. In FIG. 4, the restricting projection 96 is formed at a right end surface (an end surface opposed to the driven cylindrical shaft 92) and projects rightward. The notch 97 is formed at a left end surface (an end surface opposed the drive cylindrical shaft 91). Namely, the waiting action restricting mechanism is constituted by the notch 97 and the restricting projection 96 engaging with the notch 96, and is disposed so as to be correspondent and opposite to a boundary space between the needle rollers 94a,95a from inside in a radial direction.

Figure 9:
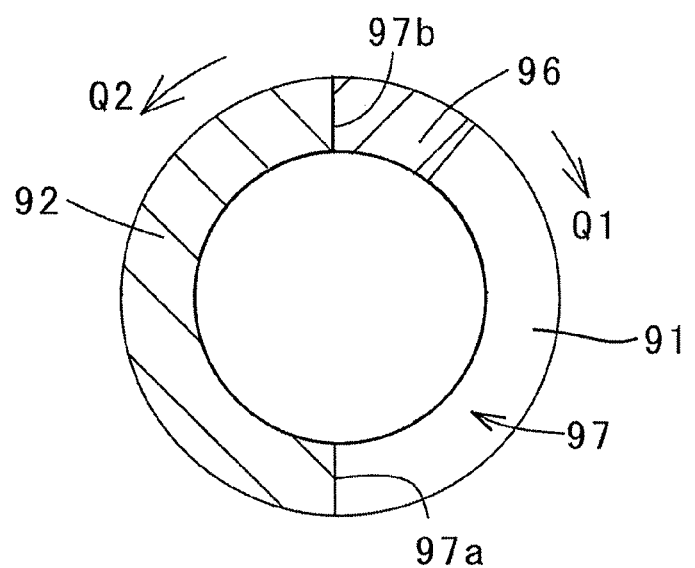
FIG. 9 is a functional view showing a condition of a regulating mechanism of the waiting mechanism when the shift lever is in the first position of FIG. 6.

FIG. 9 shows a condition of the restricting projection 96 and the restricting notch 97 when the shift lever 60 is in the first position. In the condition of FIG. 9, the restricting projection 96 is opposite to an end face 97a in a direction indicated by an arrow Q1 of the restricting notch 97 by having play at a predetermined angle and is abutted onto an end face 97b in a direction indicated by an arrow Q2 of the restricting notch 97 by a fixed force by a spring force of the coil spring 93. In other words, when the waiting mechanism 83 is assembled, the coil spring 93 is twistably attached so that the drive cylindrical shaft 91 having the restricting projection 96 is relatively biased in the direction indicated by the arrow Q2 to the driven cylindrical shaft 92, and with this, the restricting projection 96 is usually abutted onto the end face 97b in the direction indicated by the arrow Q2 of the restricting notch 97 by the spring force of the coil spring 93 of FIG. 5.

In the case that the shift lever 60 in the condition of FIG. 6 or 7 is rotated in the direction indicated by the arrow R1, when end faces of the dog teeth 70 and 71 of FIG. 2 are abutted or end faces of the spline teeth 53 and 54 are abutted, the drive cylindrical shaft 91 of FIG. 4 is rotated in the direction indicated by the arrow Q1 relative to the driven cylindrical shaft 92, so that the coil spring 93 is twisted to enable the operating power from the electric actuator 85 (FIG. 2) to be temporarily accumulated in the coil spring 93. On the other hand, when the shift lever 60 is rotated from the condition of FIGS. 8 and 7 in the direction indicated by the arrow R2, the restricting projection 96 is abutted onto the end face 97b of the restricting notch 97, so that the drive cylindrical shaft 91 and the driven cylindrical shaft 92 are always integrally rotated in the direction indicated by the arrow Q2. In other words, the operating power cannot be accumulated in the coil spring 93.

[In the Two-Wheel-Drive and Unlocked Condition]

When the two-wheel-drive/four-wheel-drive switching mechanism 31 of FIG. 2 is in the two-wheel-drive condition and the differential lock mechanism 39 is in the unlocked condition, like FIG. 6, the shift lever 60 is located in the first position, the first drive pin 56a is located in the unlock position A1, and the second drive pin 74a is located in the two-wheel-drive position B1. In other words, the inner spline teeth 54 and the outer spline teeth 53 of the differential lock mechanism 39 shown in FIG. 2 do not engage with each other, and both the dog teeth 70 and 71 of the two-wheel-drive/four-wheel-drive switching mechanism 31 do not engage with each other. And, the restricting mechanism of the waiting mechanism 83 is in the condition of FIG. 9.

In addition, in FIG. 6, the projection 78 of the shift lever 60 is abutted onto the detection pin 77a-1 of the first position sensor 77-1, and with this, the meter displays that the two-wheel-drive/four-wheel-drive switching mechanism 31 is in the two-wheel-drive condition and the differential lock mechanism 39 is in the unlocked condition.

[A Switching Operation from the Two-Wheel-Drive Condition to the Four-Wheel-Drive Condition]

As shown in FIG. 2, when the differential lock mechanism 39 is maintained in the unlocked condition and the two-wheel-drive/four-wheel-drive switching mechanism 31 is switched from the two-wheel-drive condition to the four-wheel-drive condition, the electric actuator 85 is driven to rotate the waiting mechanism 83 in the direction indicated by the arrow Q1 of FIG. 4, so that the shift lever 60 is rotated from the first position of FIG. 6 to the second position of FIG. 7 in the direction indicated by the arrow R1 via the output gear 84 (FIG. 4) and the sector gear 79 (FIG. 3). The first drive pin 56a is maintained in the unlock position A1, and the second drive pin 74a is moved from the two-wheel-drive position B1 to the four-wheel-drive position B2 in a direction indicated by an arrow E2 (rearward) by an action of the second guide groove 75, so that both the dog teeth 70 and 71 engage with each other in the two-wheel-drive/four-wheel-drive switching mechanism 31 of FIG. 2.

At the time of this operation, when the end faces of the dog teeth 70 and 71 of the two-wheel-drive/four-wheel-drive switching mechanism 31 are abutted to each other, a waiting action of the waiting mechanism 83 is exerted. In other words, only the drive cylindrical shaft 91 is rotated from the condition shown in FIG. 9 in the direction indicated by the arrow Q1, and the driven cylindrical shaft 92 is maintained in a stopped condition, so that the waiting mechanism 83 is brought into the condition of FIG. 10. With this, the coil spring 93 of FIG. 3 is twisted to accumulate the operating power from the electric actuator 85.

Figure 10:
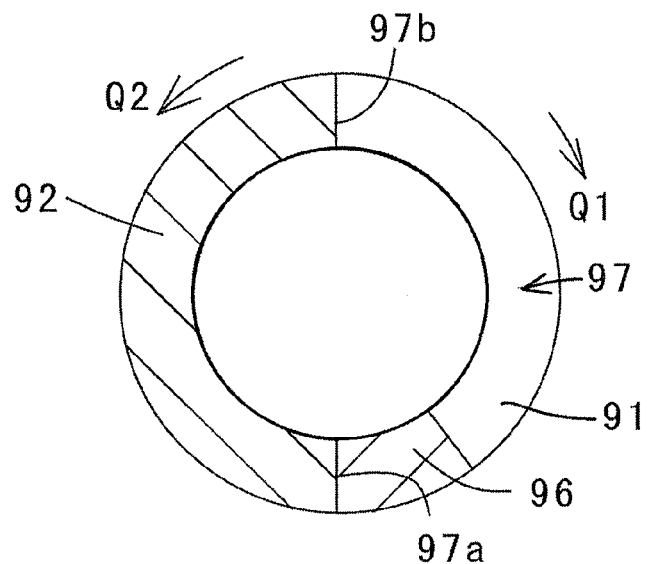
FIG. 10 is a functional view of the regulating mechanism of the waiting mechanism when a waiting action is produced at the time of a switching operation from the condition of FIG. 9 to the four-wheel-drive condition.
Figure 11:
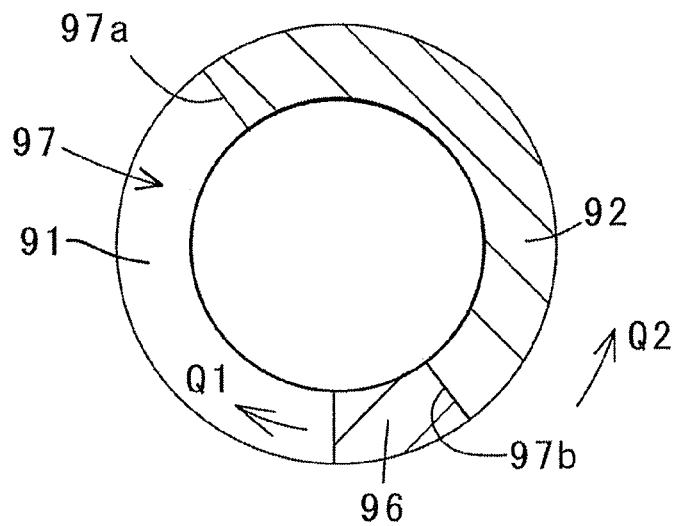
FIG. 11 is a functional view showing a condition of the regulating mechanism of the waiting mechanism when the shift lever is in the second position of FIG. 7.

At the time of the waiting action of FIG. 10, when both the dog teeth 70 and 71 of the two-wheel-drive/four-wheel-drive switching mechanism 31 are relatively rotated to reach an engagable relative position, the driven cylindrical shaft 92 is rotated at a predetermined angle in the direction indicated by the arrow Q1 relative to the drive cylindrical shaft 91 by the operating power accumulated in the coil spring 93, and with this, the shift lever 60 is moved from the first position of FIG. 6 to the second position of FIG. 7 in the direction indicated by the arrow R1. In other words, as shown in FIG. 2, both the dog teeth 70 and 71 of the two-wheel-drive/four-wheel-drive switching mechanism 31 engage with each other, so that the two-wheel-drive/four-wheel-drive switching mechanism 31 is automatically switched from the two-wheel-drive condition to the four-wheel-drive condition.

When the shift lever 60 reaches the second position of FIG. 7, the projection 78 of the shift lever 60 is abutted onto the detection pin 77a-2 of the second position sensor 77-2, and with this, the meter displays that the two-wheel-drive/four-wheel-drive switching mechanism 31 is in the four-wheel-drive condition and the differential lock mechanism 39 is in the unlocked condition.

[A Switching Operation from the Unlocked Condition to the Locked Condition in the Four-Wheel-Drive Condition]

When the four-wheel-drive condition is maintained and the differential lock mechanism 39 is switched from the unlocked condition to the locked condition, the electric actuator 85 is driven to further rotate the waiting mechanism 83 in the direction indicated by the arrow Q1 of FIG. 4, so that the shift lever 60 is rotated from the second position of FIG. 7 to the third position of FIG. 8 in the direction indicated by the arrow R1 via the output gear 84 and the sector gear 79. The second drive pin 74a is maintained in the four-wheel-drive position, and the first drive pin 56a is moved from the unlock position A1 to the lock position A2 by an action of the first guide groove 58, so that the inner spline teeth 54 and the outer spline teeth 53 of FIG. 2 engage with each other.

At the time of this operation, when the end faces in an axial direction of the inner spline teeth 54 and the outer spline teeth 53 are abutted onto each other, the waiting action of the waiting mechanism 83 is exerted. In other words, only the drive cylindrical shaft 91 is rotated from the condition shown in FIG. 11 in the direction indicated by the arrow Q1, and the driven cylindrical shaft 92 is maintained in the stopped condition, so that the waiting mechanism 83 is brought into the condition of FIG. 12. With this, the coil spring 93 of FIG. 3 is twisted to accumulate the operating power from the electric actuator 85 in the coil spring 93.

Figure 12:
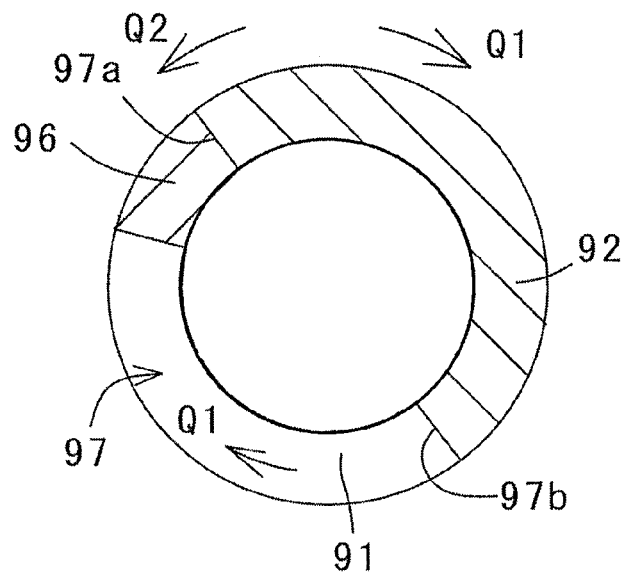
FIG. 12 is a functional view of the regulating mechanism of the waiting mechanism when the waiting action is produced at the time of a switching operation from the condition of FIG. 11 to the locked condition.
Figure 13:
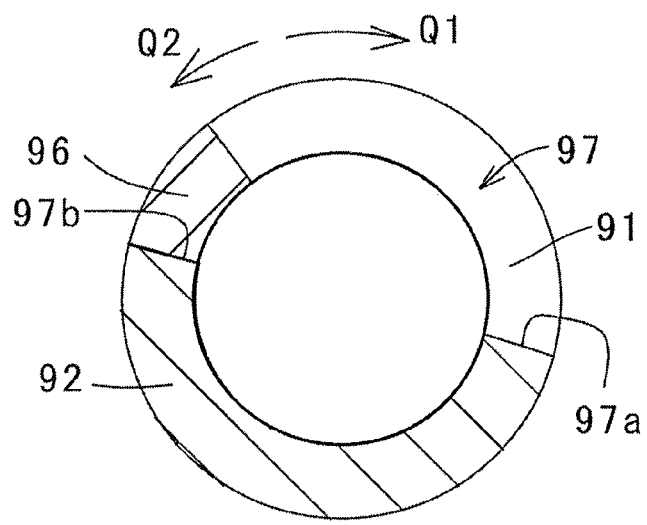
FIG. 13 is a functional view showing a condition of the regulating mechanism of the waiting mechanism when the shift lever is in the third position of FIG. 8.
Figure 14:
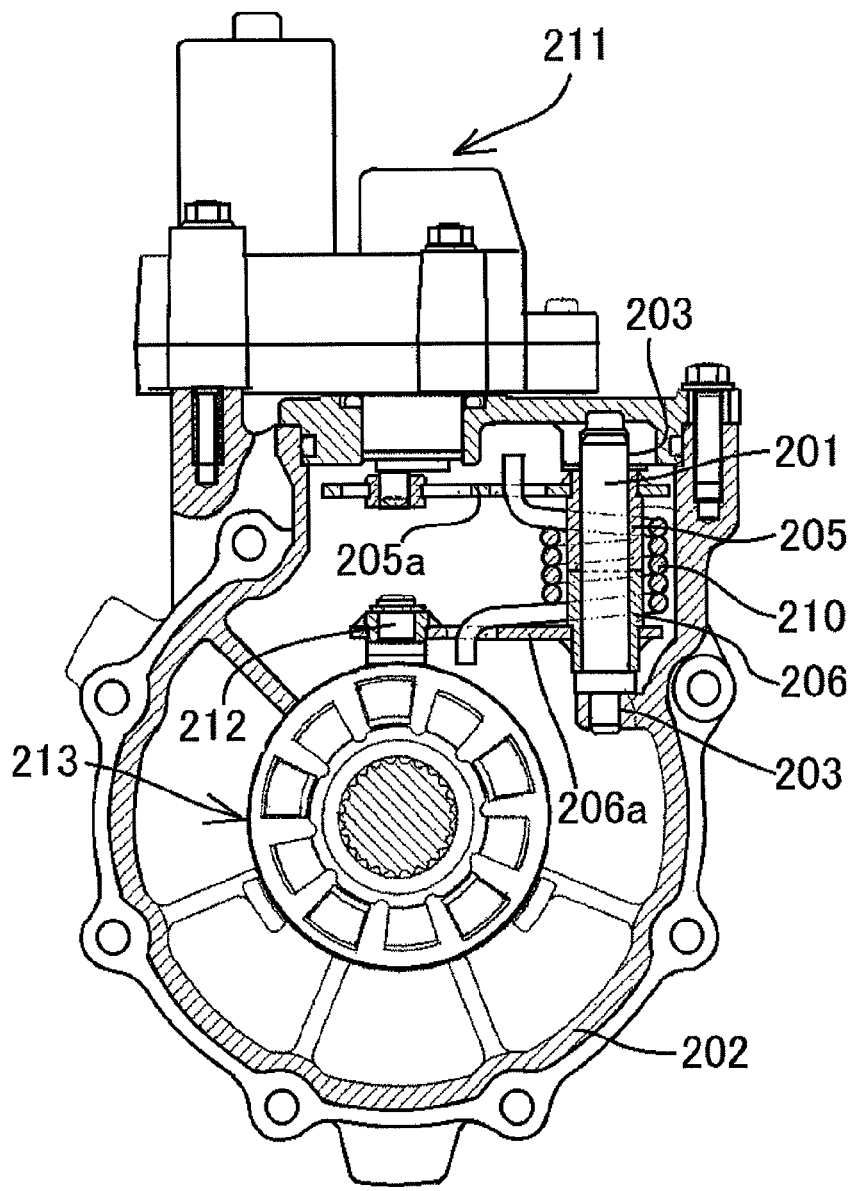
FIG. 14 is a sectional view of a conventional example.

At the time of the waiting action of FIG. 12, when the inner spline teeth 54 and the outer spline teeth 53 of the differential lock mechanism 39 of FIG. 2 are relatively rotated to reach the engagable relative position, as shown in FIG. 13, the driven cylindrical shaft 92 is rotated at a predetermined angle in the direction indicated by the arrow Q1 relative to the drive cylindrical shaft 91 by the operating power accumulated in the coil spring 93, so that the differential lock mechanism 39 is automatically switched from the unlocked condition to the locked condition. In other words, both the spline teeth 53 and 54 of the differential lock mechanism 39 of FIG. 2 are brought into the engaged condition.

As shown in FIG. 8, when the shift lever 60 reaches the third position, the projection 78 is abutted onto the detection pin 77a-3 of the third position sensor 77-3, and with this, the meter displays that the two-wheel-drive/four-wheel-drive switching mechanism 31 is in the four-wheel-drive condition and the differential lock mechanism 39 is in the locked condition.

[Switching from the Locked Condition to the Unlocked Condition]

When the shift lever 60 is returned from the third position of FIG. 8 to the second position of FIG. 7 to release lock of the differential lock mechanism 39, the output shaft 85d of the electric actuator 85 of FIG. 3 is rotated in the direction indicated by the arrow Q2, the drive cylindrical shaft 91, the driven cylindrical shaft 92, and the output gear 84 of the waiting mechanism 83 are rotated in the direction indicated by the arrow Q2, and the shift lever 60 is rotated from the third position of FIG. 8 in the direction indicated by the arrow R2 via the sector gear 79. With this, engagement of both the spline teeth 53 and 54 of the differential lock mechanism 39 is released.

At the time of this operation, the restricting projection 96 and the end face 97b in the direction indicated by the arrow Q2 of the restricting notch 97 are abutted onto each other all the time, so that the waiting action of the waiting mechanism 83 is not produced. In other words, the first drive pin 56a is moved in the direction indicated by the arrow D2 so as to release the engagement of the inner spline teeth 54 and the outer spline teeth 53 of the differential lock mechanism 39 of FIG. 2, so that no situations exerting the waiting action are caused.

[Switching from the Four-Wheel-Drive Condition to the Two-Wheel-Drive Condition]

When the shift lever 60 is returned from the second position of FIG. 7 to the first position of FIG. 6 to return the two-wheel-drive/four-wheel-drive switching mechanism 31 from the four-wheel-drive condition to the two-wheel-drive condition, the output shaft 85d of the electric actuator 85 of FIG. 3 is rotated in the direction indicated by the arrow Q2, the drive cylindrical shaft 91, the driven cylindrical shaft 92, and the output gear 84 of the waiting mechanism 83 are rotated in the direction indicated by the arrow Q2, and the shift lever 60 is rotated from the second position of FIG. 7 in the direction indicated by the arrow R2 via the sector gear 79. With this, engagement of both the dog teeth 70 and 71 of the two-wheel-drive/four-wheel-drive switching mechanism 31 is released. At the time of this operation, as in the lock release operation, the waiting action of the waiting mechanism 83 is not produced. In other words, the second drive pin 74a is moved so as to release the engagement of the dog teeth 70 and 71 of the two-wheel-drive/four-wheel-drive switching mechanism 31 of FIG. 2, so that no situations exerting the waiting action are caused.

A Summary of the Effects of the Embodiment (a) In FIG. 5, since the outer peripheral surfaces of the drive cylindrical shaft 91 and the driven cylindrical shaft 92 are supported on the inner peripheral surface 89a of the boss portion 89 through the needle roller bearings 94, 95 respectively, a surface supporting both the cylindrical shafts 91, 92 increases thereby suppress contact pressure of the surface in a low. As a result, it becomes possible to smoothly-rotate the both cylindrical shafts 91, 92 and smoothly-produce waiting action due to the torsion of the coil spring 93.

(b) In FIG. 5, both of the drive and driven cylindrical shaft 91, 92 have substantially the same outside diameter, and are arranged next to each other on the same cylindrical shat axis O2, and the peripheral surfaces of the drive and driven cylindrical shafts 91, 92 are supported on the inner peripheral surface 89a of the boss portion 89. Thereby, it becomes possible to increase the diameter of the coil spring 93 to increase the maximum torsion angle of the coil spring 93 without enlarging the inner diameter of the boss portion 89. As a result, even if the large rotation angle of the driven cylindrical shaft 91 is required (number of the switching positions is three positions), the waiting action will be smoothly produced on any position.

(c) In FIG. 5, the drive cylindrical shaft 91 and the driven cylindrical shaft 92 have substantially the same outside diameter, on the other hand, the inner peripheral surface 89a of the boss portion 89 has the uniform inside diameter, and the drive side needle roller bearing 94 and the driven side needle roller bearing 95 are arranged next to each other on the same cylindrical shaft axis O2. Consequently, the structure of the waiting mechanism 83 becomes simple, and a work to incorporate the waiting mechanism 83 into the boss portion 89 is improved.

(d) In FIG. 2, the waiting mechanism 83 enables the waiting action only when the differential lock mechanism 39 is switched from the unlocked condition to the locked condition and only when the two-wheel-drive/four-wheel-drive switching mechanism 31 is switched from the two-wheel-drive condition to the four-wheel-drive condition. In other words, the differential lock mechanism 39 enables the waiting action only, at the time of the engaging operation of both the spline teeth 53 and 54, and the two-wheel-drive/four-wheel-drive switching mechanism 31 enables the waiting action only at the time of the engaging operation of both the dog teeth 70 and 71, so that the electric actuator 85 and the coil spring 93 of the waiting mechanism 83 can be reduced in volume and size.

(e) On the other hand, the differential lock mechanism 39 is switched from the locked condition to the unlocked condition and when the two-wheel-drive/four-wheel-drive switching mechanism 31 is switched from the four-wheel-drive condition to the two-wheel-drive condition, the operating power of the coil spring 93 is not accumulated, so that a quick-response and immediate operation can be performed.

(f) In FIG. 4, the projection 96 and the notch 97 of the waiting mechanism restricting mechanism are located on a position corresponding to the boundary between the drive side needle roller bearing 94 and the driven side needle roller bearing 95 in the same cylindrical shaft axis O2 direction, and opposite to the above boundary from inside in a radial direction of the cylindrical shafts 91, 92. Thereby, it becomes possible to make efficient use of the space between the drive side needle roller 94a and the driven side needle roller 95a, and the waiting mechanism can be made compact.

(g) In FIG. 2, the differential lock mechanism 39 and the two-wheel-drive/four-wheel-drive switching mechanism 31 are operated using the shared electric actuator 85 and the shared waiting mechanism 83, so that the number of components for operating the respective mechanisms can be reduced.

(h) In FIG. 2, the differential lock mechanism 39 uses the engagement of the inner spline teeth 54 and the outer spline teeth 53, so that a relative rotation angle between the inner spline teeth 54 and the outer spline teeth 53 by the coil spring 93 necessary for lock at the time of the waiting action can be smaller and a smooth switching operation can be ensured.

(i) In FIG. 3, The shared shift lever 60 has the first guide groove 58 for operating the differential lock mechanism and the second guide groove 75 for the two-wheel-drive/four-wheel-drive switching at both ends in a radial direction, so that in this point, the size of the operating mechanism and the number of components can be reduced.

(j) In FIG. 2, the waiting mechanism 83 is arranged outside the electric actuator 85, so that a general-purpose product can be used as the electric actuator 85.

(k) The potentiometer for detecting the amount of rotation is provided on the rotating member arranged in the electric actuator 85, so that the amount of operating power from the electric actuator to the waiting mechanism 83 can be easily detected.

(l) In FIG. 6-9, the first position sensor 77-1 for detecting a rotation position of the shift lever 60 when the two-wheel-drive/four-wheel-drive switching mechanism 31 is in the two-wheel-drive condition and the differential mechanism 39 is in the unlocked condition, the second position sensor 77-2 for detecting a rotation position of the shift lever 60 when the two-wheel-drive/four-wheel-drive switching mechanism 31 is in the four-wheel-drive condition and the differential mechanism is in the unlocked condition, and the third position sensor 77-3 for detecting a rotation position of the shift lever 60 when the two-wheel-drive/four-wheel-drive switching mechanism 31 is in the four-wheel-drive condition and the differential mechanism is in the locked condition are provided outward in the radial direction of the shift lever 60, so that the three conditions of the differential lock mechanism 39 and the two-wheel-drive/four-wheel-drive switching mechanism 31 can be precisely detected.

Other Embodiments (1) In the structure shown in FIG. 5, the retainer 94b of the drive side needle roller bearing 94 and the retainer 95b of the driven side needle roller bearing 95 are separated from each other. However, in the present invention, the retainer 94b and 95a may be integrally constituted in a body. In this case, the shared retainer retains the needle roller bearings 94, 95 so as to permit a relative movement between the needle rollers 94a, 95a around the cylindrical shaft axis O2.

(2) In the present invention, the outside diameter of the drive cylindrical shaft 91 and the outside diameter of the driven cylindrical shaft 92 may be different from each other.

(3) In the above embodiment, the engine (internal-combustion engine) is provided as the driving source for generating driving force for driving the vehicle, but the present invention is also applicable to a vehicle equipped with an electric motor, a hydraulic motor, or a diesel engine, as the driving source.

(4) In the above embodiment, the two-wheel-drive/four-wheel-drive switching mechanism is provided as a first power switching mechanism, and the differential lock mechanism for front wheels is provided as a second power switching mechanism. However, the present invention is applied to a differential lock mechanism for rear wheels and a two-wheel-drive/four-wheel-drive switching mechanism. In addition, other power switching mechanisms for vehicle, for example various clutch mechanisms, a High-Low speed switching mechanism and so on, may be utilized.

(5) In the above embodiment, the waiting mechanism is constituted so that the waiting action of the waiting mechanism is produced in only one rotating direction. However, in the present invention, the waiting mechanism may be constituted so that the waiting action is produced in any rotating direction.

(6) An electric actuator into which the potentiometer is not incorporated can also be provided.

(7) The present invention is not limited to the configuration of the above embodiment and includes various modification examples contemplated in the scope without departing from the contents described in the claims.

What is claimed is:

1. A power switching device for vehicle, the switching device comprising:
at least first and second power switching mechanisms arranged on the way of a driving force transmission passage from a driving source to wheels;
a shared operating mechanism to switch both of the first and second power switching mechanisms on and off; the shared operating mechanism having a waiting mechanism; and
a housing accommodating the first and second power switching mechanisms and the shard operating mechanism, the housing being integrally formed with a boss portion having the waiting mechanism built-in, wherein:
the waiting mechanism includes a drive cylindrical shaft located in an operation side, a driven cylindrical shaft located in an actuation side, and a coil spring connecting the driven cylindrical shaft with the drive cylindrical shaft so as to transmit an operating power,
both of the drive and driven cylindrical shafts and the coil spring are arranged in a same cylindrical shaft axis,
the drive cylindrical shaft is supported on an inner peripheral surface of the boss portion through a drive side needle roller bearing, and the driven cylindrical shaft is supported on the inner peripheral surface of the boss portion through a driven side needle roller bearing, and the coil spring is arranged inside the drive cylindrical shaft and the driven cylindrical shaft.

2. The power switching device for vehicle as claimed in claim 1, wherein the drive cylindrical shaft and the driven cylindrical shaft have substantially a same outside diameter, an inner peripheral surface of the boss portion has an uniform inside diameter, and the drive side needle roller bearing and the driven side needle roller bearing are arranged next to each other on the cylindrical shaft axis direction, and are retained by a shared retainer.

3. The power switching device for vehicle as claimed in claim 2, wherein one of the drive cylindrical shaft and the driven cylindrical shaft is formed with an arcuate notch about the cylindrical shaft axis and the other is formed with a projection for engaging with the notch so as to be movable in a circumferential direction, and only when at least one of the first and second switching mechanisms is operated from a disengaged condition of the power to an engaged condition, the projection and the notch are relatively moved in the circumferential direction to compress the coil spring.

4. The power switching device for vehicle as claimed in claim 3, wherein the notch and the projection are located in a position corresponding to a boundary between the drive side needle roller bearing and the driven side needle roller bearing in the cylindrical shaft axis direction, and opposite to the above boundary from inside in a radial direction of the cylindrical shafts.

5. The power switching device for vehicle as claimed in claim 1, wherein the first switching mechanism is a two-wheel-drive/four-wheel-drive switching mechanism, and the second switching mechanism is a differential lock mechanism which can lock a differential device.

6. The power switching device for vehicle as claimed in claim 5, wherein a shared shift lever of the shared operating mechanism can be switched among a first position, a second position, and a third position, when the shared shift lever is located in the first position, the two-wheel-drive/four-wheel-drive switching mechanism is in a two-wheel-drive condition, and the differential lock mechanism is in an unlocked condition, when the shared shift lever is located in the second position, the two-wheel-drive/four-wheel-drive switching mechanism is in a four-wheel-drive condition, and the differential lock mechanism is in the unlocked condition, and when the shared shift lever is located in the third position, the two-wheel-drive/four-wheel-drive switching mechanism is in the four-wheel-drive condition, and the differential lock mechanism is in a locked condition.

* * * * *